United States Patent Office 2,957,017
Patented Oct. 18, 1960

2,957,017

MANUFACTURE OF MONO-ALKYL ALKYLPHOSPHOROFLUORIDITE

Anthony Francis Childs, Winterflow, near Salisbury, and Leslie Thomas Douglas Williams, Waltham Abbey, England, assignors to the Minister of Supply in Her Majesty's Government of the United Kingdom of Great Britain and Northern Ireland, London, England No Drawing. Filed Mar. 22, 1955, Ser. No. 496,066

Claims priority, application Great Britain Mar. 22, 1954

6 Claims. (Cl. 260—461)

This invention relates to the manufacture of organic phosphorous compounds and particularly concerns a new process for the production of halogen derivatives of alkylphosphinic acids.

It has been found that, contrary to expectation, tervalent phosphorus compounds containing a halogen atom attached to the phosphorus may be caused to undergo the Arbuzov reaction.

Thus, for example, it has been found that by heating di-isopropyl phosphorofluoridite with methyl iodide it can be converted to mono-isopropyl methylphosphonofluoridate. (This compound was formerly sometimes called isopropyl methylfluorophosphinate.) Thus, the tervalent phosphorus atom in the starting compound becomes pentavalent and at the same time a direct carbon-phosphorus linkage is established in the product. Products of this type are of considerable importance in connection with the production of organic phosphorus compounds containing halogen some of which are highly toxic substances.

Accordingly, the present invention comprises a process for the manufacture of a mono-alkyl alkylphosphonofluoridate having the formula

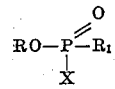

(in which R and $R_1$ mean alkyl radicals which may be similar), wherein a dialkyl phosphorofluoridite, $(RO)_2PF$ is reacted with an alkyl ester, for example an alkyl iodide $R_1I$, and the mono-alkyl alkylphosphonofluoridate so formed is separated from the products of the reaction.

The reaction may be represented by the following equation:

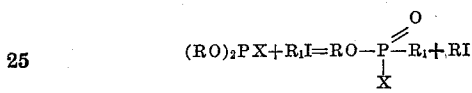

In order that the invention may be readily understood, one form of the process will be described in outline by way of illustration as follows:

The hitherto unknown compound di-isopropyl phosphorofluoridite (iso-PrO)$_2$PF is first prepared, for example, by the interaction of isopropanol and phosphorus dichlorofluoride in the presence of a tertiary base, and after separation and purification is then converted to isopropyl methylphosphonofluoridate by heating with methyl iodide. The main reaction is represented as follows: (iso-PrO)$_2$PF+MeI=Me.PO(iso-Pr)F+(iso-Pr)I. The reaction is not complete at refluxing temperatures but when carried out according to the invention by heating under pressure in a sealed container in a boiling water bath the reaction is substantially complete, giving a good yield of the isopropyl methylphosphonofluoridate which is separated from the reaction mixture by fractional distillation under reduced pressure.

The process of the invention may also be applied to the production of derivatives of alkylphosphinic acids containing a halogen substituent other than fluorine, for example chlorine. The products in this case are alkyl alkylphosphonochloridates which may be produced in an analogous manner.

The present invention in its broader aspect therefore provides a process for the manufacture of a mono-alkyl alkylphosphonohalidate having the formula:

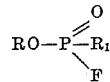

(in which R and $R_1$ mean alkyl radicals which may be similar, and X is fluorine or chlorine), wherein a dialkylphosphorohalidite having the formula: $(RO)_2PX$ is reacted with a reactive alkyl ester, for example an alkyl iodide, to produce a mixture containing a mono-alkyl alkylphosphonohalidate which is then separated from the products of the reaction.

The process may be represented by the following equation:

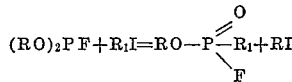

which indicates the relationship of the process to the well-known Arbuzov rearrangement.

The following example illustrates one method of carrying the invention into effect.

EXAMPLE

*Production of isopropyl methylphosphonofluoridate*

In the first stage, phosphorus dichlorofluoride is prepared from phosphorus trichloride by the method of Cook et al. (J. Chem. Soc. 1949, 2924).

In the second stage, phosphorus dichlorofluoride is distilled into dry ether cooled to 0° C., and the solution added with stirring to a solution of isopropyl alcohol and diethylaniline in dry ether. All the operations are carried out under a stream of dry nitrogen.

After standing for one hour the solution is warmed to refluxing temperature, cooled and filtered. After removal of the solvent through a 40 cm. helix-packed column, the residue is distilled in vacuo giving a fraction boiling at 49–52° C./53 mm. Redistillation gives a fraction boiling at 52° C./56 mm. which is di-isopropyl phosphorofluoridite, a colourless mobile liquid with a characteristic, rather unpleasant smell.

In the third stage, di-isopropyl phosphorofluoridite (7.4 g.) and methyl iodide (3 ml.) are sealed in a Carius tube, and heated for 7 hours in a boiling water bath. After cooling, the tube is opened and the contents distilled. The main fraction distils at 40–49° C./4 mm. This fraction is contaminated with di-isopropylphosphorofluoridate. Redistillation taking a small middle cut gives 2.7 g. (44%) of pure isopropyl methylphosphonofluoridate.

Although the invention is primarily concerned with the Arbuzov rearrangement in which an alkyl iodide is used, the invention also includes the use of reactive esters other than an alkyl iodide such as dimethyl sulphate, or methyl p-toluenesulphonate.

We claim:

1. Process for the production of a mono-alkyl alkylphosphonofluoridate of the formula:

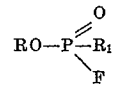

in which R and $R_1$ are lower alkyl radicals, which process comprises alkylating a dialkyl phosphorofluoridite (RO)$_2$PF with a reactive alkyl ester to produce a mixture from which the required product is separated by distillation.

2. Process as in claim 1, wherein the reactive alkyl ester is an alkyl iodide.

3. Process as in claim 1, wherein the reactive alkyl ester is dimethyl sulphate.

4. Process for the production of a mono-alkyl alkylphosphonohalidate of the formula:

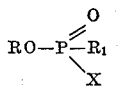

in which R and R$_1$ are lower alkyl radicals, and X is a member of the group consisting of fluorine and chlorine, which process comprises reacting a dialkyl phosphorohalidite (RO)$_2$PX with a reactive alkyl ester to produce a mixture from which the required product is separated by distillation.

5. Process as in claim 4, wherein the reactive alkyl ester is an alkyl iodide.

6. Process for the production of isopropyl methylphosphonofluoridate

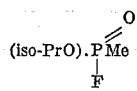

which process comprises reacting di-isopropyl phosphorofluoridite (iso-PrO)$_2$PF, with methyl iodide under pressure and separating the required product by fractional distillation.

References Cited in the file of this patent

Kosolapoff: Organophosphorus Compounds, page 121, John Wiley & Sons, 1950.

Chemical and Engineering News, vol. 31, page 4676 (1953).